United States Patent
Atkins et al.

(10) Patent No.: US 10,452,639 B2
(45) Date of Patent: Oct. 22, 2019

(54) PROCESSING JOINS IN A DATABASE SYSTEM USING ZERO DATA RECORDS

(71) Applicant: SAP SE, Walldorf (DE)

(72) Inventors: Brendon Atkins, Brisbane (AU); William Myers, Brisbane (AU)

(73) Assignee: SAP SE, Walldorf (DE)

( * ) Notice: Subject to any disclaimer, the term of this patent is extended or adjusted under 35 U.S.C. 154(b) by 486 days.

(21) Appl. No.: 15/385,597

(22) Filed: Dec. 20, 2016

(65) Prior Publication Data

US 2018/0046670 A1 Feb. 15, 2018

Related U.S. Application Data

(60) Provisional application No. 62/374,708, filed on Aug. 12, 2016.

(51) Int. Cl.
| | |
|---|---|
| *G06F 17/30* | (2006.01) |
| *G06F 16/23* | (2019.01) |
| *G06F 16/25* | (2019.01) |
| *G06F 16/22* | (2019.01) |
| *G06F 16/2455* | (2019.01) |
| *G06F 16/2453* | (2019.01) |

(52) U.S. Cl.
CPC ........ *G06F 16/235* (2019.01); *G06F 16/2237* (2019.01); *G06F 16/2264* (2019.01); *G06F 16/2282* (2019.01); *G06F 16/2358* (2019.01); *G06F 16/2386* (2019.01); *G06F 16/2455* (2019.01); *G06F 16/2456* (2019.01); *G06F 16/24537* (2019.01); *G06F 16/254* (2019.01)

(58) Field of Classification Search
CPC ............. G06F 16/235; G06F 16/2237; G06F 16/2386; G06F 16/24537; G06F 16/2282; G06F 16/2455; G06F 16/2456
See application file for complete search history.

(56) References Cited

PUBLICATIONS

Brendon Atkins, Pending U.S. Appl. No. 15/382,333, filed Dec. 16, 2016.
Brendon Atkins, Pending U.S. Appl. No. 15/336,535, filed Oct. 27, 2016.
Myers et al, Pending U.S. Appl. No. 15/336,609, filed Oct. 27, 2016.
Ashley Farr, Pending U.S. Appl. No. 15/384,105, filed Dec. 19, 2016.

*Primary Examiner* — Jared M Bibbee
(74) *Attorney, Agent, or Firm* — Fountainhead Law Group P.C.

(57) ABSTRACT

In one embodiment, a method stores a mapping table that includes a zero data identifier corresponding to a zero data record in the second database table. The method receives a query for data in a cube data structure. A first join between the first database table and the mapping table and a second join between the second database table and the mapping table are performed to generate a combined table for the cube data structure. The combined table includes a combined record that includes information from a first record from the first database table and includes the zero data identifier with information from the zero data record in the second database table when the first record for an entity in the first database table does not include a corresponding second record for the entity in the second database table.

20 Claims, 10 Drawing Sheets

| Row ID | Person ID | Name | Gender | Location | Row ID | Person ID | Goal Name | Rating |
|---|---|---|---|---|---|---|---|---|
| 1 | A | Brendon | Male | Brisbane | 1 | A | Build cube | 0 |
| 2 | B | Tim | Male | Brisbane | 2 | B | Learn Java | 100 |
| 2 | B | Tim | Male | Brisbane | 2 | B | Build GUI | 55 |
| 3 | C | William | Male | San Francisco | 0 | - | ----- | - |

PROCESSING JOINS IN A DATABASE SYSTEM USING ZERO DATA RECORDS

CROSS REFERENCE TO RELATED APPLICATIONS

The present disclosure claims priority to U.S. Provisional App. No. 62/374,708, entitled "In-Memory Database System for Performing Online Analytics Processing", filed Aug. 12, 2016, the contents of which is incorporated herein by reference in its entirety.

BACKGROUND

In the new era of big data, companies and other organizations have access to vast amounts of structured and unstructured data as well as access to a variety of new data sources. As a result, many data analytics applications have been developed to provide users with insight into their data. One example genre of data analytics applications includes workforce analytics. Workforce analytics applications are used by businesses and other organizations to assist users in understanding their data, making appropriate decisions, and find answers to key questions to gain the insight needed to take actions. Workforce analytics applications are adapted for providing statistical models to worker-related data, allowing companies to optimize their various enterprise processes.

The workforce analytics application may use a cube data structure to respond to queries. To build the cube data structure, several fact tables need to be joined together. Each fact table includes parts of the data for the cube data structure. The database system uses a join to build the complete picture of the data for the cube data structure. To ensure that no data is lost when the join is performed, the database system can perform an outer join. The outer join may still create a record for the cube data structure when a record exists in one table without a corresponding record in another table. However, the outer join is a slow process and when the outer join is performed in real time, a user of the database system may experience slow response times.

DETAILED DESCRIPTION

Described herein are techniques for a system to generate data for a cube data structure using a key mapping table. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments generate a key mapping table that maps the keys for a record from a first fact table to the keys of a second fact table. When there is a missing corresponding record in a first fact table for a record in a second fact table, the key mapping table may map the record in the second fact table to a zero data identifier record in the first fact table where the data is set to "null". For example, the zero data record may be a row with an identifier of "0" (e.g., row_ID=0) in the first fact table. This allows an inner join to be performed because corresponding records in both fact tables will exist. If the key mapping table was not used, then a corresponding record in the first fact table would not exist and the inner join would not return any data for a join even though a record existed in the second fact table. This is because the inner join performs an intersection that does not return a record when there is not a corresponding record in one of the fact tables. An outer join that performs a union that returns a record when the record exists in either fact table could be used, but the performance of the database system using the inner join is greatly improved in contrast to using the outer join.

Overview

Figure 1:
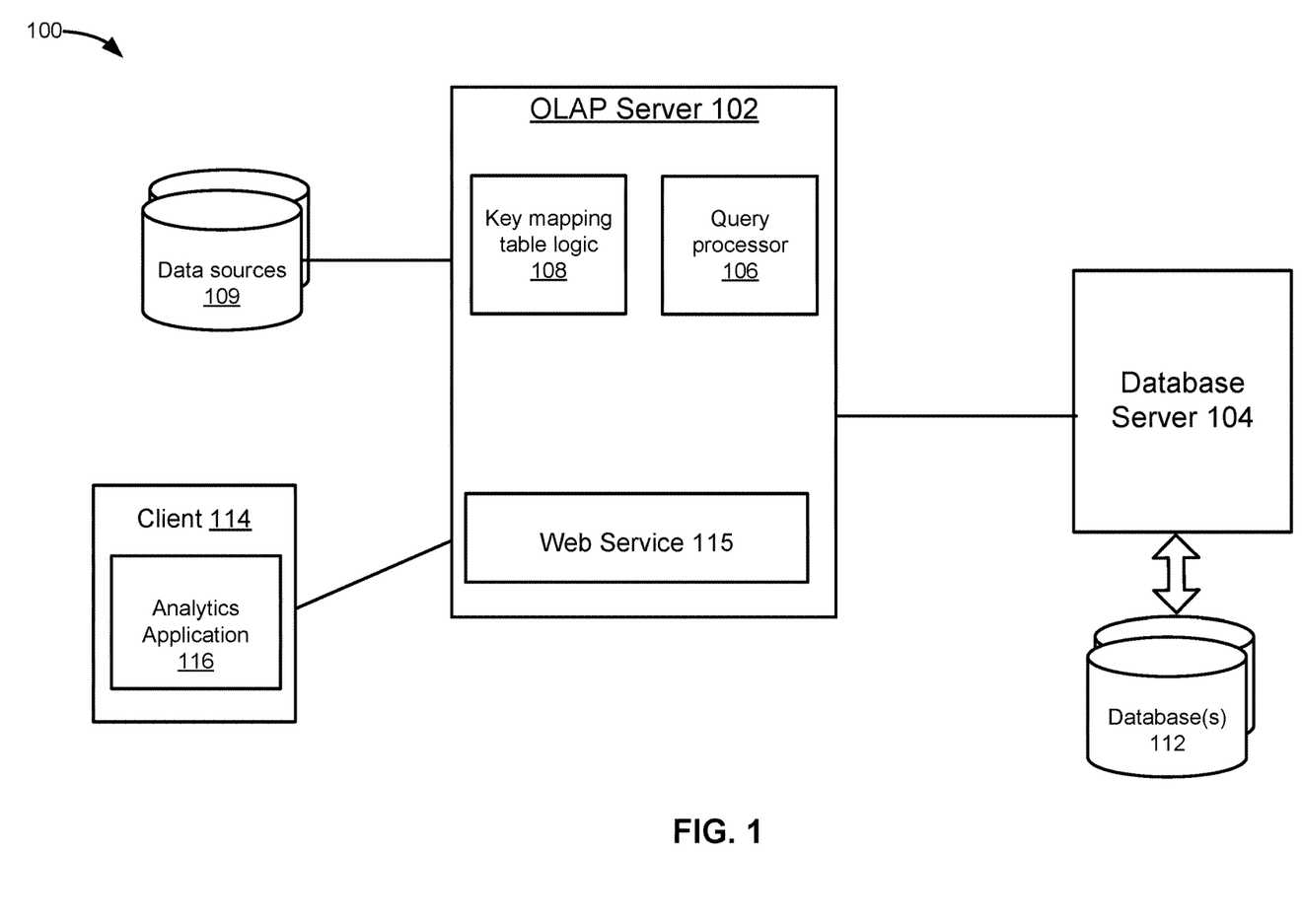
FIG. 1 depicts a simplified system for performing inner joins to build a table for a cube data structure using a key mapping table according to one embodiment.

FIG. 1 depicts a simplified system 100 for performing inner joins to build a table for a cube data structure using a key mapping table according to one embodiment. Key mapping table logic 108 can generate a key mapping table that can be used to combine tables, such as fact tables. A fact table may be generated based upon available subscriber data. A fact table contains data which represents a timeline per entity (e.g., a person or employee) for a subscriber. Each fact table that is generated is generally dedicated to a particular subject matter (e.g., workforce movements, goals, recruiting, etc.). The fact tables allow for more efficient cube data structure design as the cube data structure is smart enough to load only fact tables from which data is being queried. Although fact tables will be described, it will be understood that other types of tables may be used. Also, two fact tables may be described, but more than two fact tables may be used.

As will be described in more detail below, key mapping table logic 108 may generate key mapping table 108 from the pre-existing fact tables. For example, key mapping logic 108 performs an outer join to combine the fact tables. The outer join may perform an intersection that returns a record even when a second fact table includes a record where a corresponding record does not exist in the first fact table. In this case, the outer join returns a record that includes a null value for a row identifier in the first fact table. A null value may not have a corresponding value in one of the fact tables.

Key mapping table logic 108 may then generate a key mapping table that includes the values (e.g., keys) for a first column (e.g., a row identifier column) from the first fact table and a second column (e.g., a row identifier column) from the second fact table. Key mapping table logic 108 then replaces the null values in either the first column or the second column with a zero data identifier. The zero data identifier corresponds to a zero data row that is added to the first fact table and the second fact table. By including a zero data identifier instead of a null value, the first table and the second table will always have corresponding records because the zero data identifier is different from a null value. The null value does not have a corresponding record in a fact table, but the zero data identifier does have a corresponding record. Because there will always be corresponding records, particular embodiments can use inner joins to join tables without losing any records when queries are processed at runtime.

After the linking is performed, at runtime, a query can be received. For example, the query is performed by a user using a user interface. Examples of queries include a headcount measure sliced by the gender dimension to determine how many male employees, and how many female employees, are in a company. The query requests data from fact tables. Then, upon receiving the query, a query processor 106 performs an inner join for the fact tables using the key mapping table. This generates data for a cube data structure. As discussed above, the inner join is different from the outer join in that when the inner join encounters a first record in the second fact table that does not have a corresponding record in the first fact table (or vice versa), the inner join does not return any record at all. However, using the key mapping table, records are returned (and not lost) because corresponding records that were not found in one of the fact tables map to the zero data record. The key mapping table is used to perform the mapping to the zero data record. Using the key mapping table allows the inner join to be performed instead of an outer join to prepare data for the cube data structure to process queries. The inner join generates data for the cube data structure that includes a record from a second fact table even though a corresponding record in a first fact table may not exist. The record for the second fact table maps to the zero data row in the first fact table instead of a null value.

Particular embodiments may be used in an online analytical processing system (OLAP). However, other systems may be used. An example of an OLAP will now be described briefly. Source data is provided by a number of different data sources 109. The source data may be received at an online analytical processing ("OLAP") server 102 and stored on OLAP server 102. Data sources may include data records for one or more subscribers. Subscribers may include customers, businesses, companies, and other entities for which data is stored in database 112.

In one embodiment, database 112 is an OLAP database that can be accessed by a client 114 using an analytics application 116. Analytics application 116 may include a workforce analytics (WFA) application. As discussed above, workforce analytics applications are used by subscribers in understanding the subscribers' data. For example, workforce analytics applications are adapted for providing statistical models to worker-related data, such as employees for a subscriber. The data for a subscriber may include entities, which may be employees or people. A web service 115 may be used to respond to queries from analytics application 116 by accessing data in database 112 via database server 104.

Database 112 includes source data for different subscribers that are using analytics application 116. The source data in database 112 may be formatted for the cube data structure. In one example, base measures are built into fact tables and categorized according to dimensions, which may be slices corresponding to time, department, company, division, location, or other entities. The data and data object hierarchies can be processed based on collating the dimensions into the cube data array. The cube data structure can aggregate reportable values into aggregates that can be validated and reported to a user. In one example, a cube data structure may enable easy aggregation of multiple values into a single number for analytics reporting via analytics application 116. Each number can be categorized by dimensions to determine the attributes of the entities that make up the number.

The cube data structure can be queried by analytics application 116 of a client 114. The cube data structure is an interface between OLAP tables in database 112 (e.g., fact, branches, and key mapping tables) and analytics application 116. The cube data structure presents the data in a more readable fashion as measures and dimensions, rather than a collection of tables. The cube data structure also allows queries to be run by analytics application 116.

Linking

Figure 2:
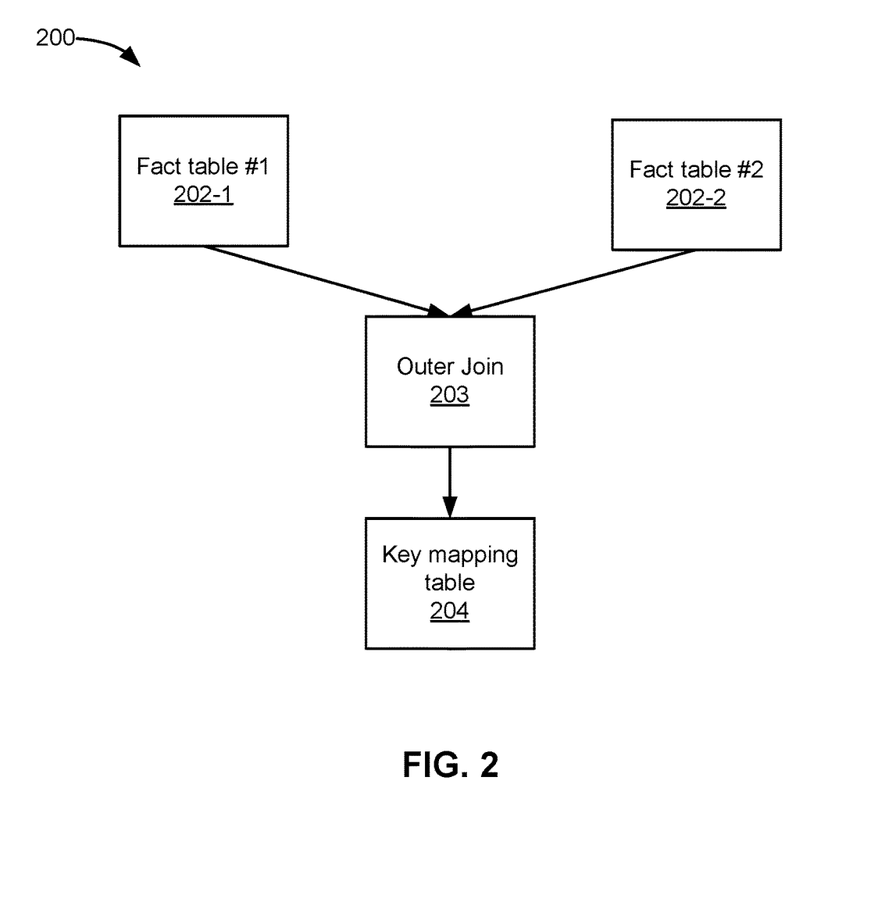
FIG. 2 depicts a simplified process flow of linking fact tables in a database to generate a key mapping table according to one embodiment.

FIG. 2 depicts a simplified process flow 200 of linking fact tables in database 112 to generate a key mapping table 204 according to one embodiment. A first fact table #1 202-1 and a second fact table #2 202-2 may be linked by an outer join at 203 to create a key mapping table 204. The join is performed before a query is received, such as overnight or at periodic intervals. The fact tables to join together is defined by logic in a cube data structure. For example, the cube data structure may define that first fact table #1 202-1 and second fact table #2 202-2 should be joined together, such as by an inner join.

In one embodiment, the outer join may be a full outer join that will perform a union of available time periods from both fact tables 202-1 and 202-2. Then, in one embodiment, the records from each fact table are joined together using another union or the same union by comparing available time periods of records between the fact tables. Although a full outer join may be described, other types of joins that do not return a record when a corresponding record does not exist in one fact table can be used.

Figure 3A:
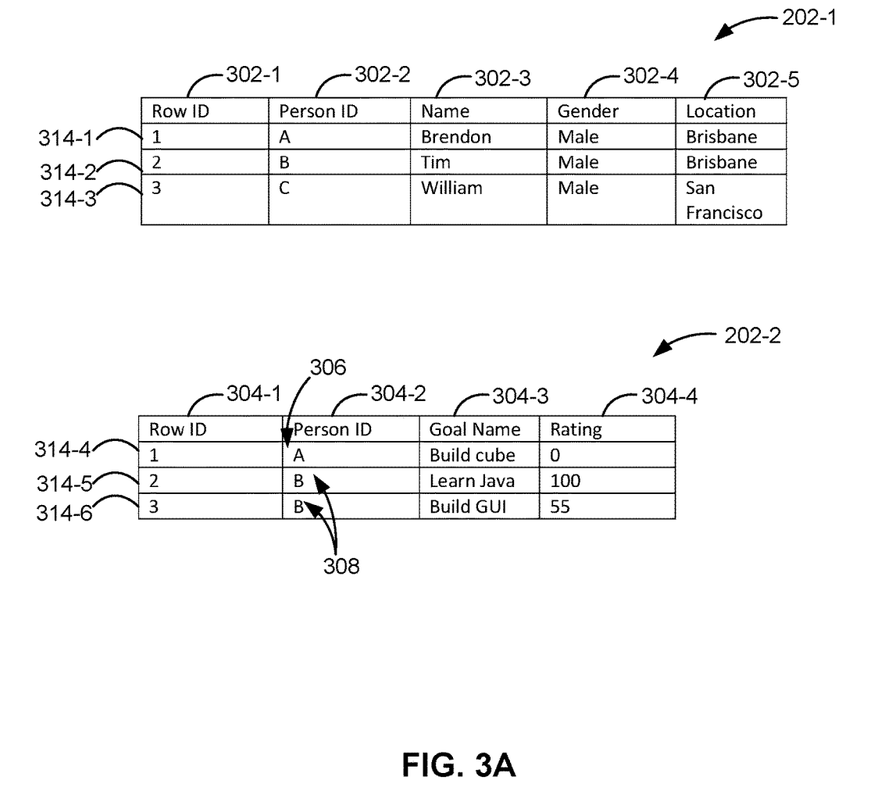
FIG. 3A shows an example of fact tables according to one embodiment.

FIG. 3A shows an example of fact tables 202-1 and 202-2 according to one embodiment. Fact table 202-1 may summarize a workforce for a subscriber. Columns 302-1-302-5 summarize different characteristics for the subscriber's workforce and rows 314-1-314-3 show entities (e.g., employees) for the subscriber. For example, columns 302-1-302-5 describe a row identifier (ROW_ID), a person identifier (PERSON_ID), a name, a gender, and a location, respectively. The row ID is a key that identifies the row of fact table 202-1; the person ID is the identifier for the employee; the name is the name of the employee; the gender may be male or female; and the location is the location where the employee works.

Fact table 202-2 summarizes the goals for the entities of the subscriber. In one embodiment, not all entities in fact table 202-1 have goals. Fact table 202-2 includes columns 304-1-304-4 for the row identifier, person identifier, goal name (GOAL_NAME), and rating. The goal name is the name of the goal and the rating is a score of how much progress the person had made to reach the goal. Rows 314-4-314-6 in fact table 202-2 may identify a person identifier to which the goal is directed. For example, at 306, a goal for person identifier A with the name of Brendan is shown as "build cube". Then on rows #2 and #3, two goals for person identifier B with the name of Tim is shown of "learn javascript" and "build graphical user interface (GUI)", respectively. It is noted that person C with the name of William does not have a goal in fact table 202-2. Thus, the record in row 314-3 of fact table 202-1 does not include a corresponding record for William because William does not have any goals listed in fact table 202-2.

Figure 3B:
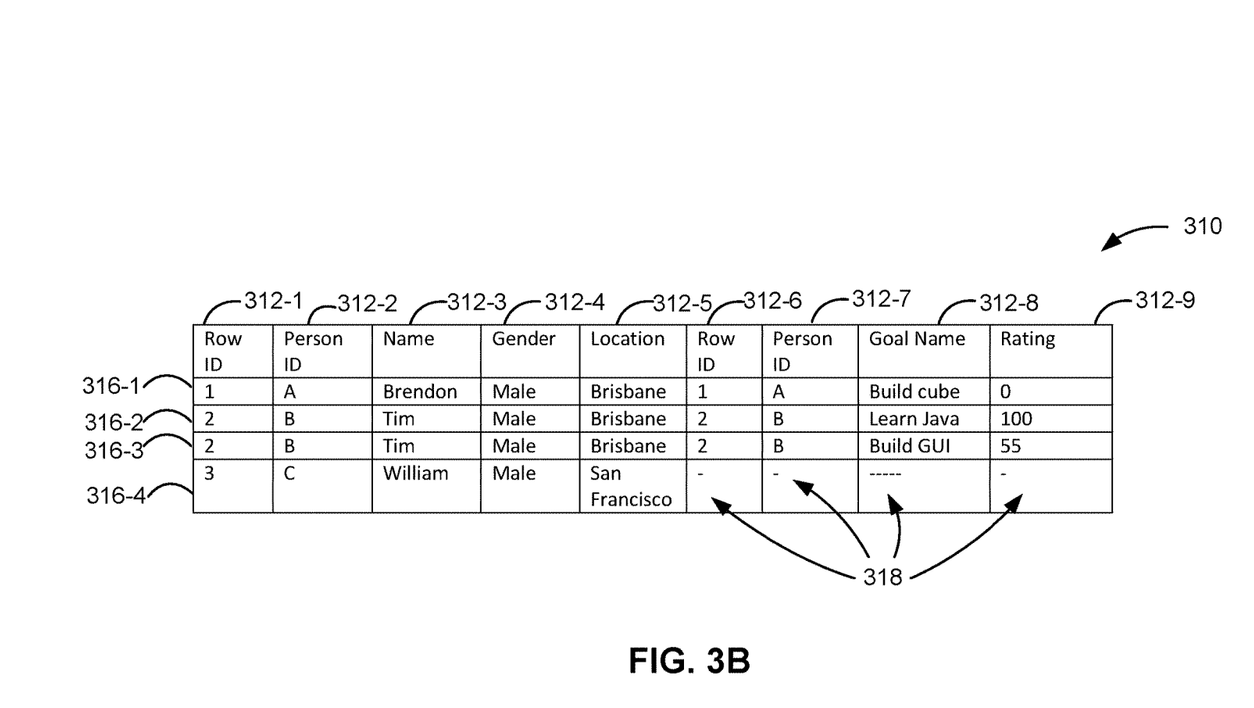
FIG. 3B shows a table shows a table that is the result of an outer join of a first fact table and a second fact table according to one embodiment.

FIG. 3B shows a table 310 shows a table that is the result of an outer join of fact table 202-1 and fact table 202-2 according to one embodiment. In one embodiment, a full outer join is used. Table 310 includes columns 312-1-312-9. The columns of fact table 202-1 and fact table 202-2 have been combined where columns 312-1-312-5 correspond to columns 302-1-302-5 of fact table 202-1 and columns 312-6-312-9 correspond to columns 304-1-304-2 of fact table 202-2.

The rows 316-1-316-4 of table 310 include the combined information from fact table 202-1 and fact table 202-2. For example, for row ID #1, the information in row 314-1 of fact table 202-1 and in row 314-2 of fact table 202-2 has been combined into the row 316-1. That is, the corresponding goal for person ID A has been joined with the information for person ID A from fact table 202-1. For row 316-2 of table 310, the information from row 314-2 of fact table 202-1 and row 314-5 of fact table 202-2 has been combined. The person Tim also has another goal so a row 316-3 is created in table 310 is created that includes information from row 314-2 of fact table 202-1 and row 314-6 of fact table 202-2. In this case, key mapping table logic 108 creates two entries in table 310 for the same entity Tim for the two separate goals.

In row 316-4 of table 310, the person with the name of William did not have a goal in table 202-2. If an inner join was performed to combine fact table 202-1 and fact table 202-2, then the record in row 316-4 would not be created for table 310. However, because a full outer join was performed, even though a corresponding record in fact table 202-2 is not found for William (person ID of C), a record is still created for William. However, at 318, null values are inserted in columns 312-6-312-9 for William. The null value in column 312-6 for row 316-4 does not have a corresponding row ID in fact table 202-2.

After performing the outer join, key mapping table logic 108 generates key mapping table 204 based on the rows in table 310. For example, key mapping logic 108 may receive the results of the full outer join, and then create key mapping table 204 based on the results.

Figure 4:
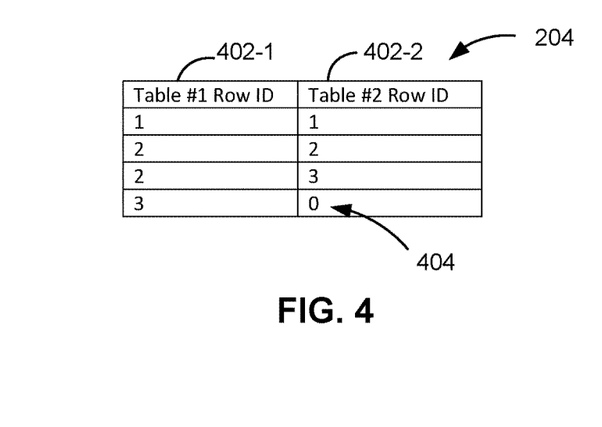
FIG. 4 shows an example of a key mapping table according to one embodiment.

To generate key mapping table 204, key mapping table logic 108 adds a row identifier that is returned for fact table 202-1 and fact table 202-2 to key mapping table 204. For example, FIG. 4 shows an example of key mapping table 204 according to one embodiment. In a column 402-1, the row identifiers for column 312-1 of table 310 are shown, and in a column 402-2, the row identifiers for column 312-6 of table 310 are shown. In column 402-1, the row identifiers are 1, 2, 2, 3, which correspond to the values in column 312-1 of table 310. In column 402-2, the values are 1, 2, 3, and 0, where the values of 1, 2, and 3 correspond to the values in rows 316-1, 316-2, and 316-3 of column 312-6 of table 310. When a null value is returned from table 310, then key mapping logic 108 includes a zero data identifier as the row identifier in key mapping table 204. For example, the zero data identifier value of "0" at 404 may be used for the row identifier when a null value is returned from table 310, but values other than "0" may be used.

Key mapping table logic 108 also adds a corresponding row in fact table 202-1 and fact table 202-2 for the zero data identifier. For example, key mapping table logic 108 adds a row with the "0" row identifier to fact tables 202-1 and 202-2. Any values for other columns for the zero data identifier row may be null values. By including the zero data row identifiers and a zero data row in fact tables 202-1 and 202-2, an inner join may be performed without losing a record even when a corresponding record does not exist in one of the fact tables 202-1 and 202-2. The zero data identifier is different from a null value, which did not have a corresponding row in fact table 202-1 or 202-2.

Runtime Execution

Figure 5:
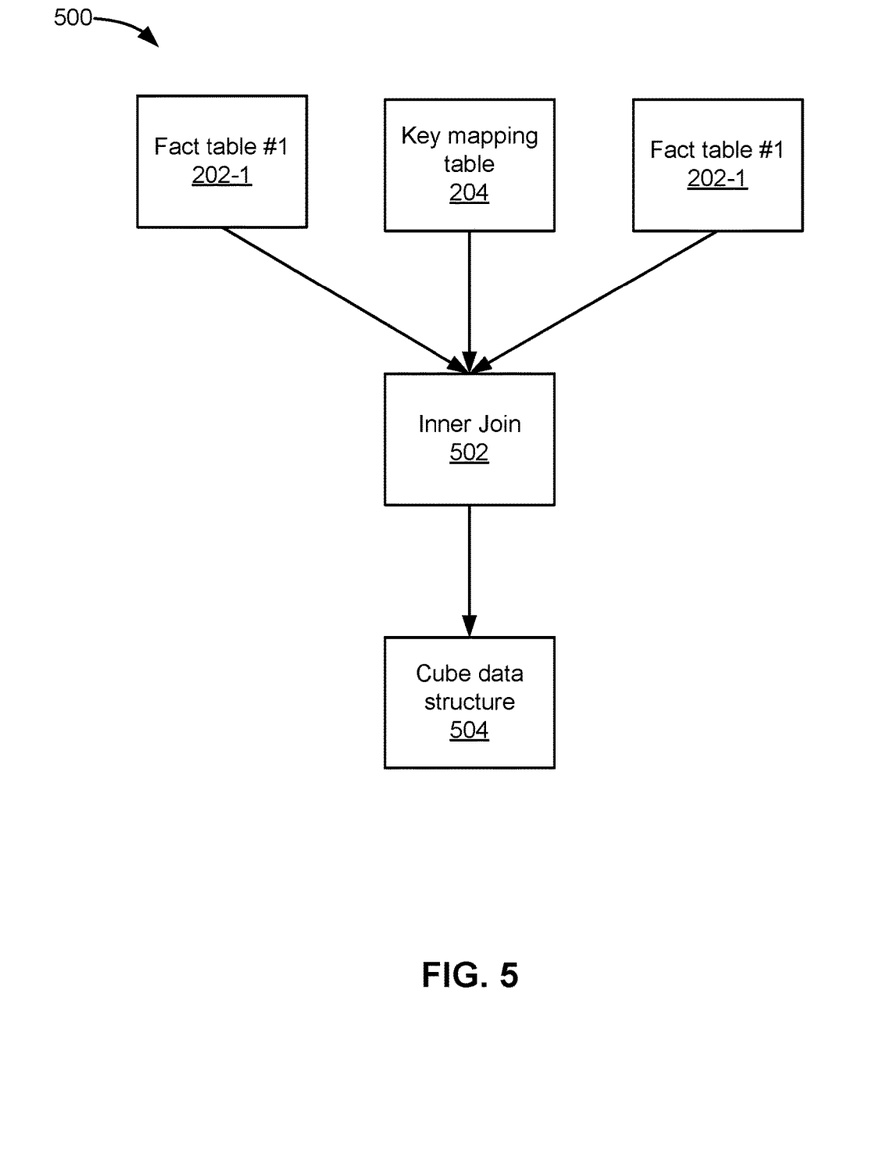
FIG. 5 depicts an example process of using the key mapping table at runtime according to one embodiment.

After key mapping table 204 is generated, then queries may be executed using key mapping table 204 at runtime. FIG. 5 depicts an example process 500 of using key mapping table 204 at runtime according to one embodiment. At 502, query processor 106 performs a first inner join using fact table 202-1 and key mapping table 204, and also performs a second inner join using fact table 202-2 and key mapping table 204. The result of the two inner joins produces data for a cube data structure 504. For example, a combined table including data from both fact table 202-1 and fact table 202-2 is created for cube data structure 504. The query can then be run against data for cube data structure 504.

Figure 6A:
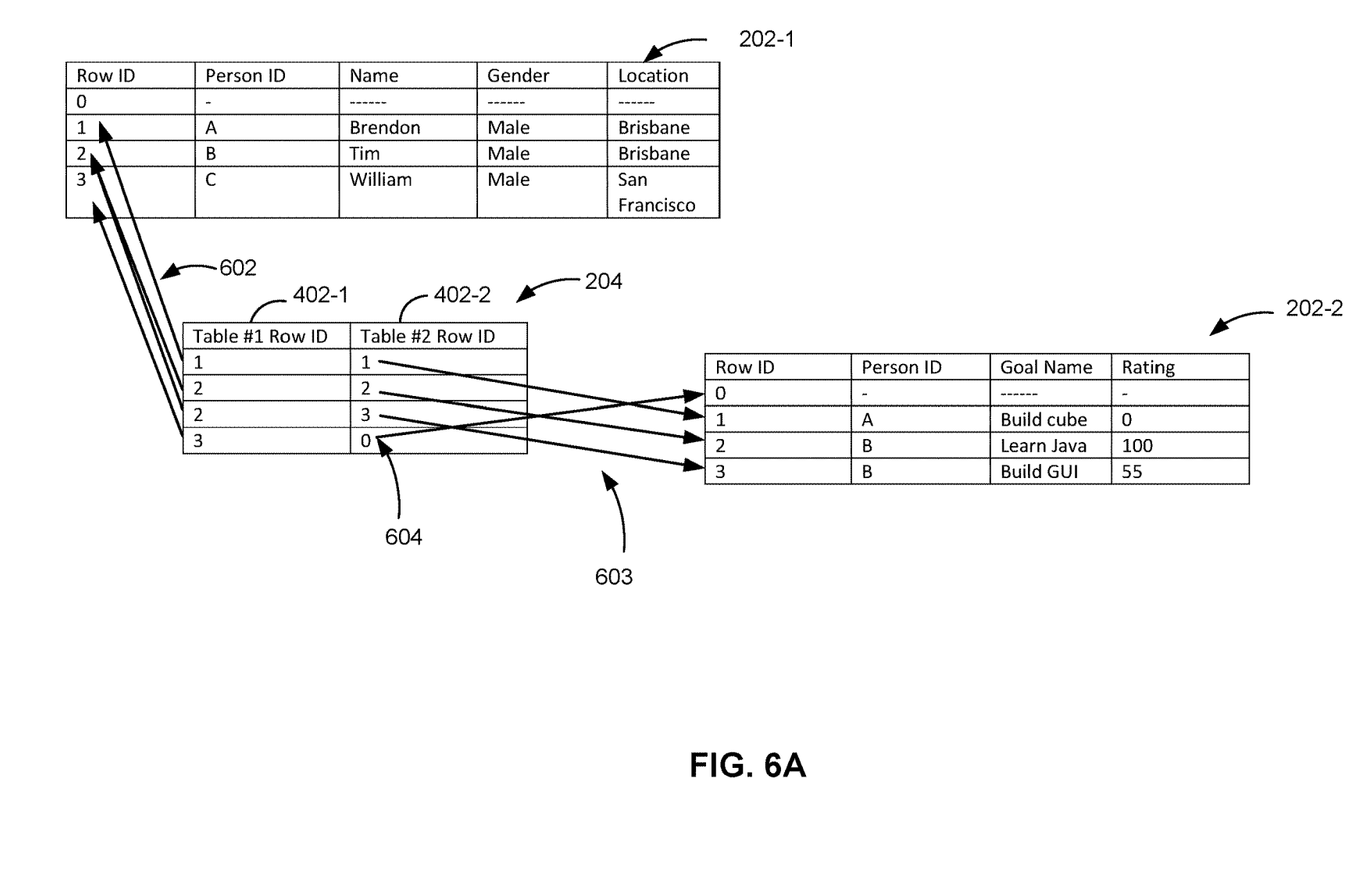
FIG. 6A shows an example of performing the inner joins according to one embodiment.
Figure 6B:
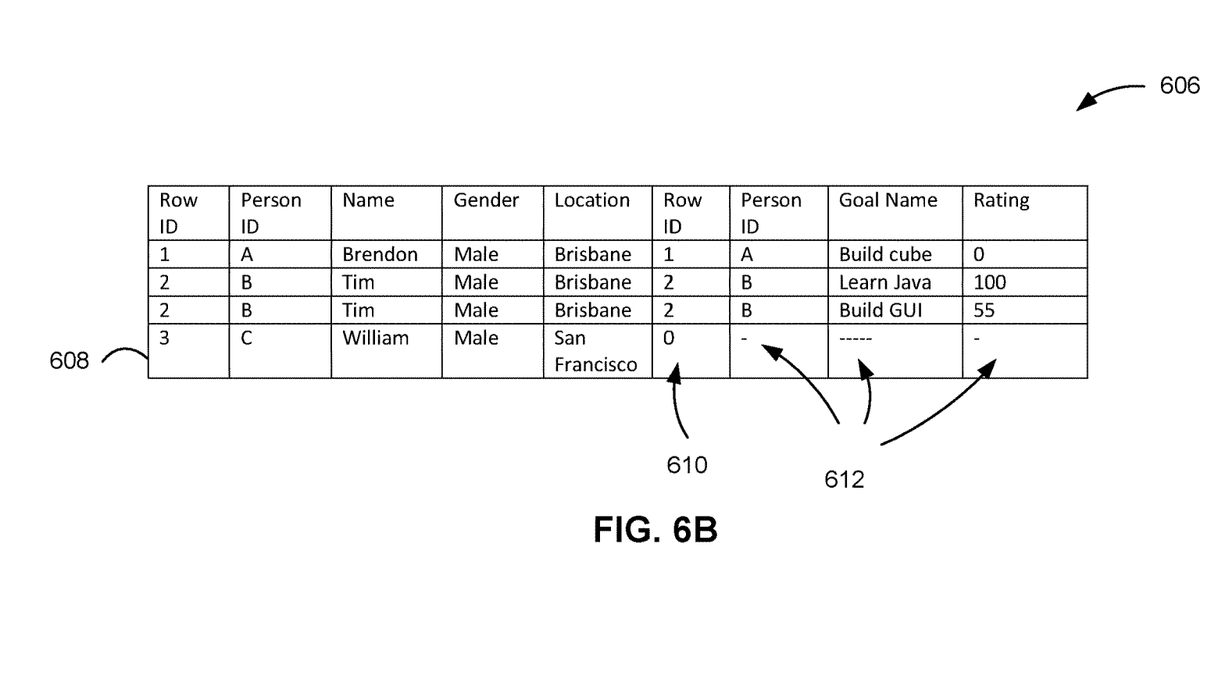
FIG. 6B shows a combined table that is a result of the inner joins according to one embodiment.

FIG. 6A shows an example of performing the inner joins and FIG. 6B shows a combined table 606 that is a result of the inner joins according to one embodiment. Query processor 106 may perform an inner join between fact table 202-1 and key mapping table 402-1 shown at 602 and also an inner join between table 202-2 and key mapping table 204 shown at 603 when a query is received. Cube data structure 504 defines a combined table 606 from the inner join between table 202-1 and key mapping table 204 and another inner join between table 202-2 and key mapping table 204. This is in contrast to an inner join between table 202-1 and table 202-2 without key mapping table 204. Because of the zero data record inserted in fact tables 202-1 and 202-2, any record in key mapping table 204 with a "0" as a row identifier will join to the zero data record in fact tables 202-1 or 202-2 in a combined table 606 shown in FIG. 6B. The result of this join is a NULL value for columns associated with the zero data record.

Key mapping table 204 maps row identifiers from fact table 202-1 in column 402-1 to row identifiers for fact table 202-2 in column 402-2. For example, row identifier #1 in column 402-1 maps to row identifier #1 in column 402-2. This means that row identifier #1 in fact table 202-1 maps to row identifier #1 in fact table 202-2. The other mappings in key mapping table are row identifier #2 to row identifier #2, row identifier #2 to row identifier #3, and row identifier #3 to row identifier #0.

At 602, a first inner join between fact table 202-1 and key mapping table 204 is shown. The row identifiers of 1, 2, and 3 in fact table 202-1 are matched to the row identifiers of 1, 2, and 3 in column 402-1 of key mapping table 204. There are no zero data identifiers in this inner join in key mapping table 204. Also, there are two row identifiers of "2". The first row identifier of "2" maps to the row identifier of "2" in fact table 202-2 and the second row identifier of "2" maps to the row identifier of "3" in fact table 202-2.

In the second inner join, at 603, the row identifiers of 1, 2, and 3 in fact table 202-2 are joined with row identifiers of 1, 2, and 3 in key mapping table 204. However, at 604, a row identifier of 0 in key mapping table 204 is joined with the row identifier of 0 in fact table 202-2. Row 0 in fact table 202-2 has null values for the person identifier, goal name, and rating columns. As discussed above, row 0 did not originally exist in fact table 202-2, but is inserted such that a record always exists in fact table 202-2 for a record in fact table 202-1. Performing the inner join without an existing record in fact table 202-2 would not record any record for combined table 606. However, using the zero data record, the inner join corresponds to an existing record in fact table 202-2 instead of not having a corresponding record in fact table 202-2. Accordingly, a record in combined table 606 is included for the join between row identifier #3 and row identifier #0. For example, in FIG. 6B, in a row 608, for the row identifier #3, null values shown at 612 for the person ID, goal name, and rating have been included for a row identifier of 0 shown at 610. Table 606 is similar to the table 310 shown in FIG. 3 except that the row identifier of "0" has been included at 610 instead of the value of null in table 310. The zero data identifier of 0 is a different result from the null value that is received when full outer join is performed because the zero data identifier corresponds to a record in fact table 202-2. Other than the change at 610, the rest of combined table 606 is the same as table 310 because row identifiers #1 and #2 included a corresponding record in both fact tables 202-1 and 202-2.

Method Flows

Figure 7:
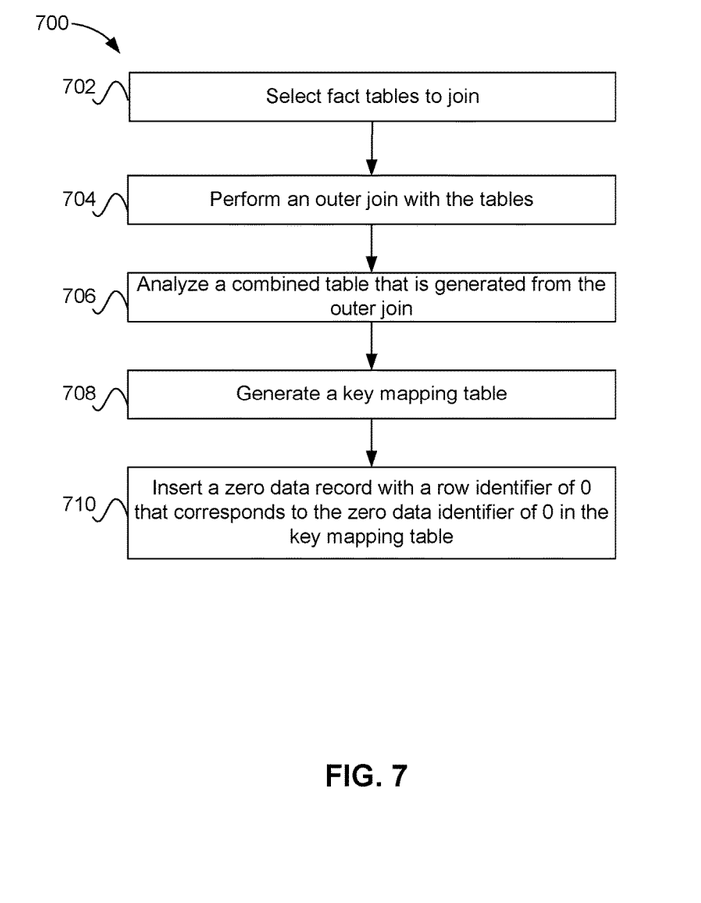
FIG. 7 depicts a simplified flowchart of a method for the linking process to generate a key mapping table according to one embodiment.

FIG. 7 depicts a simplified flowchart 700 of a method for the linking process to generate a key mapping table according to one embodiment. At 702, key mapping table logic 108 selects fact tables 202 to join. Logic in the cube data structure is used to select the tables. Then, at 704, key mapping table logic 108 performs an outer join with the tables.

At 706, key mapping table logic 108 analyzes a combined table that is generated from the outer join. For example, key mapping table logic 108 may determine where null values are returned for a row identifier. At 708, key mapping table logic 108 then generates key mapping table 204. For example, key mapping table logic 108 may replace null values for the row identifiers with a zero data identifier of "0" in key mapping table 204. Also, at 710, key mapping table logic 108 inserts a zero data record with a row identifier of 0 that corresponds to the zero data identifier of 0 in key mapping table 204.

Figure 8:
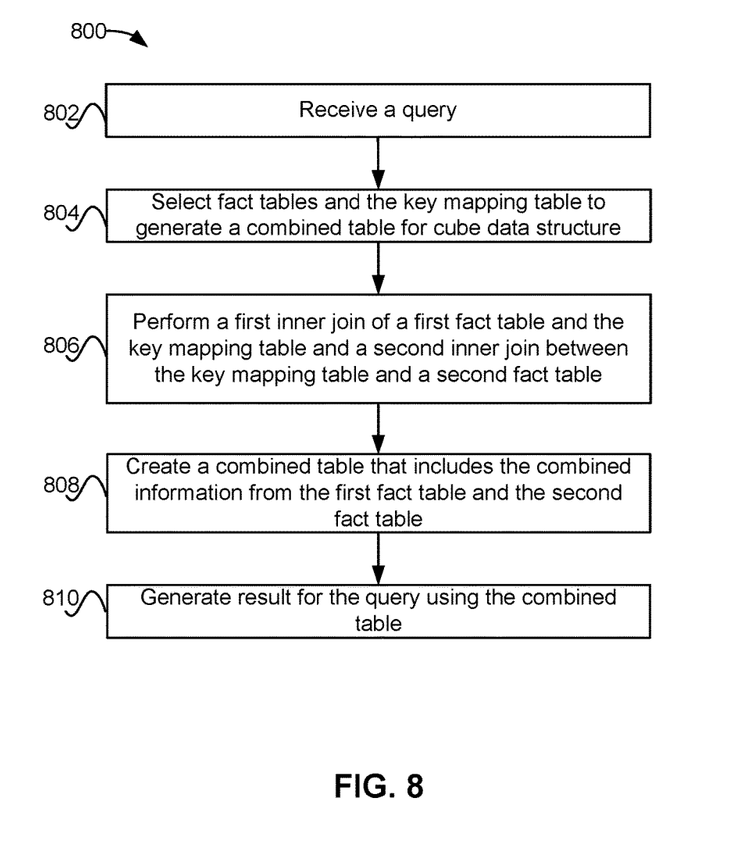
FIG. 8 depicts a simplified flowchart of a method for processing a query at runtime according to one embodiment.

FIG. 8 depicts a simplified flowchart 800 of a method for processing a query at runtime according to one embodiment. At 802, query processor 106 receives a query. The query may request data from a cube data structure 504. At 804, query processor 106 selects fact tables 202 and key mapping table 204 to generate a combined table for cube data structure 504. Query processor 106 may determine which fact tables to combine from logic of the cube data structure.

At 806, query processor 106 performs a first inner join of fact table 202-1 and key mapping table 204 and a second inner join between key mapping table 204 and fact table 202-2. The two inner joins combine records from fact table 202-1 and fact table 202-2. At 808, query processor 106 creates combined table 606 that includes the combined information from fact table 202-1 and fact table 202-2. At 810, query processor 106 can then generate a result for the query using combined table 606.

Accordingly, a more efficient inner join can be performed to generate a combined table for a cube data structure 504. The inner join runs more efficiently because when it does not encounter a corresponding record in one of the fact tables 202, then the row is not included in the combined table. The outer join is not as efficient because more operations needs to be performed to check for corresponding records and add null values for records that do not include corresponding records. Particular embodiments save even more operations when more than two fact tables are joined together. Further, the key mapping table ensures that data is not lost in the combined table because the zero data record is included in fact tables 202 and referenced in key mapping table 204. This ensures that data will not be lost when there are missing corresponding records in one of the fact tables. Accordingly, available records in one fact table 202 are returned even when there are no corresponding records in the other fact table 202.

System Implementation

Figure 9:
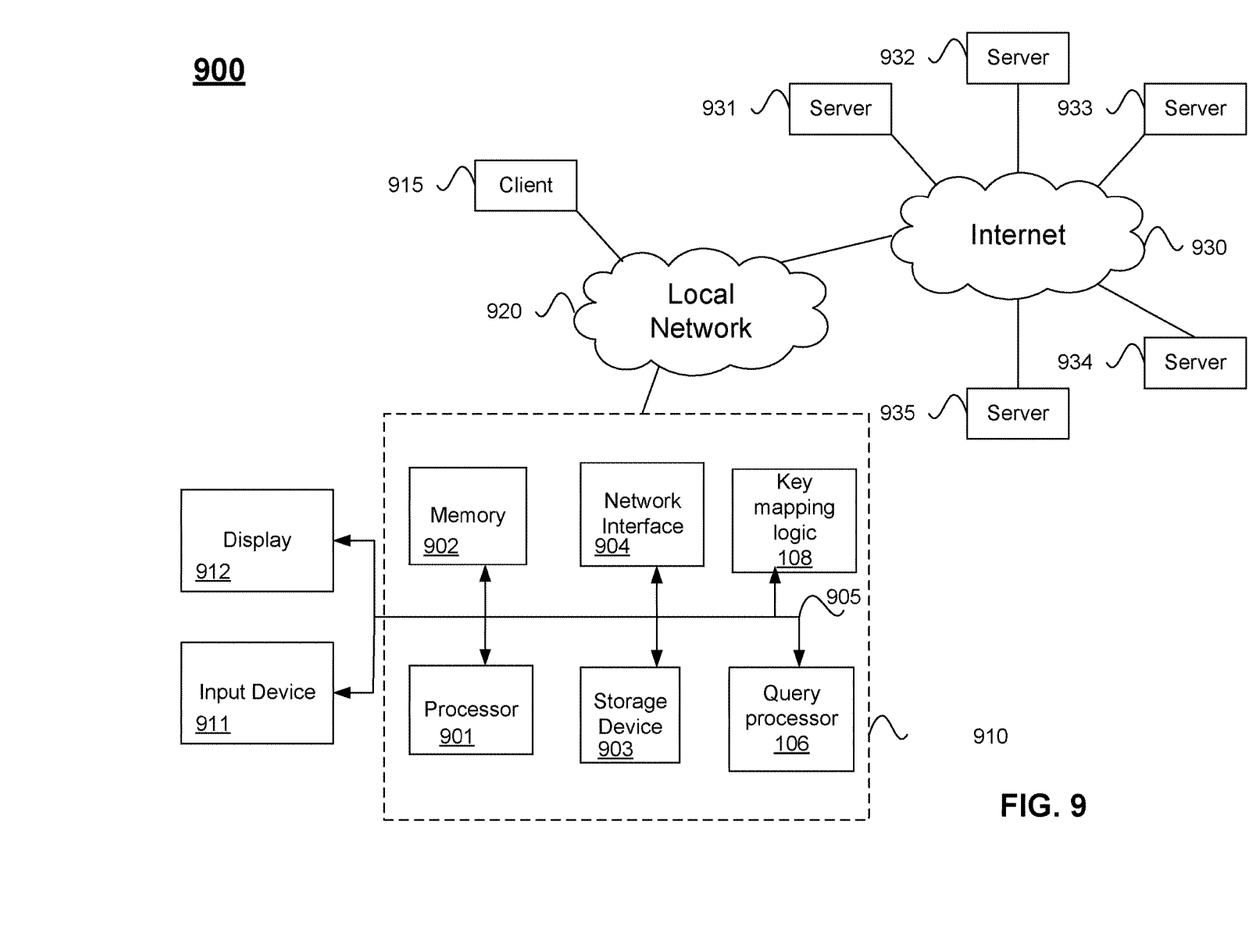
FIG. 9 illustrates hardware of a special purpose computing machine configured with the key mapping table logic and the query processor according to one embodiment.

FIG. 9 illustrates hardware of a special purpose computing machine configured with key mapping table logic 108 and query processor 106 according to one embodiment. An example computer system 910 is illustrated in FIG. 9. Computer system 910 includes a bus 905 or other communication mechanism for communicating information, and a processor 901 coupled with bus 905 for processing information. Computer system 910 also includes a memory 902 coupled to bus 905 for storing information and instructions to be executed by processor 901, including information and instructions for performing the techniques described above, for example. This memory may also be used for storing variables or other intermediate information during execution of instructions to be executed by processor 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 903 may include source code, binary code, or software files for performing the techniques above, for example. Storage device and memory are both examples of computer readable storage mediums.

Computer system 910 may be coupled via bus 905 to a display 912, such as a cathode ray tube (CRT) or liquid crystal display (LCD), for displaying information to a computer user. An input device 911 such as a keyboard and/or mouse is coupled to bus 905 for communicating information and command selections from the user to processor 901. The combination of these components allows the user to communicate with the system. In some systems, bus 905 may be divided into multiple specialized buses.

Computer system 910 also includes a network interface 904 coupled with bus 905. Network interface 904 may provide two-way data communication between computer system 910 and the local network 920. The network interface 904 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 904 sends and receives electrical, electromagnetic, or optical signals that carry digital data streams representing various types of information.

Computer system 910 can send and receive information through the network interface 904 across a local network 920, an Intranet, or the Internet 930. In the Internet example, software components or services may reside on multiple different computer systems 910 or servers 931-935 across the network. The processes described above may be implemented on one or more servers, for example. A server 931 may transmit actions or messages from one component, through Internet 930, local network 920, and network interface 904 to a component on computer system 910. The software components and processes described above may be implemented on any computer system and send and/or receive information across a network, for example.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   storing, by a computing device, a first database table, a second database table, and a mapping table, wherein the mapping table includes a zero data identifier corresponding to a zero data record in the second database table when a first record for an entity in the first database table does not include a corresponding second record for the entity in the second database table;
   receiving, by the computing device, a query for data in a cube data structure, the cube data structure including logic defining a join of the first database table and the second database table;
   performing, by the computing device, a first join between the first database table and the mapping table and a second join between the second database table and the mapping table to generate a combined table for the cube data structure, wherein the combined table includes a combined record that includes information from the first record from the first database table and includes the zero data identifier with information from the zero data record in the second database table when the first record for an entity in the first database table does not include a corresponding second record for the entity in the second database table; and
   responding, by the computing device, to the query using the combined table.

2. The method of claim 1, wherein the first join or the second join is defined by the logic of the cube data structure and is an inner join that does not return a record for the combined table when a record in one of the first database table and the second database does not include a corresponding record in the other of the first database table and the second database.

3. The method of claim 1, further comprising:
   linking the first database table and the second database table to generate the mapping table before receiving the query.

4. The method of claim 3, wherein linking comprises performing an outer join between the first database table and the second database table,
   wherein the outer join combines corresponding records from the first database table and the second database table and includes a null value for an identifier when a corresponding record in one of the first database table and the second database table does not exist for a record in the other of the first database table and the second database table.

5. The method of claim 4, wherein performing the outer join combines records with similar identifiers in the first database table and the second database table.

6. The method of claim 4, further comprising:
   generating the mapping table based on the outer join, the mapping table including identifiers from the first database table and identifiers for the second database table, wherein the zero data identifier is used when the null value is returned for an identifier from the first database table or the second database table.

7. The method of claim 3, wherein the mapping table includes a first column with identifiers for records in the first database table and a second column for identifiers in the second database table.

8. The method of claim 7, wherein the zero data identifier is included in the first column or the second column when the null value is returned from the outer join.

9. The method of claim 3, further comprising:
   adding a first zero data record in the first database table and a second zero data record in the second database table that correspond to the zero data identifier.

10. The method of claim 9, wherein the first zero data record and the second zero data record are associated with one or more null values.

11. A non-transitory computer-readable storage medium containing instructions, that when executed, control a computer system to be configured for:
    storing, a first database table, a second database table, and a mapping table, wherein the mapping table includes a zero data identifier corresponding to a zero data record in the second database table when a first record for an entity in the first database table does not include a corresponding second record for the entity in the second database table;
    receiving a query for data in a cube data structure, the cube data structure including logic defining a join of the first database table and the second database table;
    performing a first join between the first database table and the mapping table and a second join between the second database table and the mapping table to generate a combined table for the cube data structure, wherein the combined table includes a combined record that includes information from the first record from the first database table and includes the zero data identifier with information from the zero data record in the second database table when the first record for an entity in the first database table does not include a corresponding second record for the entity in the second database table; and
    responding to the query using the combined table.

12. The non-transitory computer-readable storage medium of claim 11, wherein the first join or the second join is defined by the logic of the cube data structure and is an inner join that does not return a record for the combined table when a record in one of the first database table and the second database does not include a corresponding record in the other of the first database table and the second database.

13. The non-transitory computer-readable storage medium of claim 11, further configured for:
    linking the first database table and the second database table to generate the mapping table before receiving the query.

14. The non-transitory computer-readable storage medium of claim 13, wherein linking comprises performing an outer join between the first database table and the second database table,
    wherein the outer join combines corresponding records from the first database table and the second database table and includes a null value for an identifier when a corresponding record in one of the first database table and the second database table does not exist for a record in the other of the first database table and the second database table.

15. A method comprising:
    performing, by a computing device, a first type of join on a first database table and a second database table to combine records with similar identifiers in the first database table and the second database table in a first combined table, wherein the first type of join includes a null value for an identifier in the first combined table when a corresponding record in one of the first database table and the second database table is not found in the other of the first database table and the second database table;
    generating, by the computing device, a mapping table based on the combined table, the mapping table including identifiers from the first database table and identifiers for the second database table, wherein a zero data identifier is used when the null value is found for the identifier in the first combined table;
    including, by the computing device, a zero data record in the first database table and the second database table for the zero data identifier; and
    performing, by the computing device, a second type of join on the first database table and mapping table and performing the second type of join on the second database table and the mapping table to generate a second combined table, wherein the second type of join does not include a record in the second combined table when a corresponding record in one of the first database table and the second database table is not found in the other of the first database table and the second database table, and wherein the second combined table includes a record with the zero data identifier that is determined using the mapping table.

16. The method of claim 15, wherein the second type of join is performed in response to a query.

17. The method of claim 15, wherein the second type of join is defined by the logic of the cube data structure.

18. The method of claim 15, wherein the first type of join is an outer join and the second type of join is an inner join.

19. The method of claim 15, further comprising:
    adding a zero data record in the first database table and the second database table that correspond to the zero data identifier.

20. The method of claim 19, wherein the zero data record is associated with one or more null values.

* * * * *